United States Patent
Safai et al.

(10) Patent No.: US 8,224,121 B2
(45) Date of Patent: Jul. 17, 2012

(54) SYSTEM AND METHOD FOR ASSEMBLING SUBSTANTIALLY DISTORTION-FREE IMAGES

(75) Inventors: Morteza Safai, Seattle, WA (US); Gary E. Georgeson, Federal Way, WA (US); Talion Edwards, Foristell, MO (US); John W. Finlayson, Renton, WA (US)

(73) Assignee: The Boeing Company, Chicago, IL (US)

( * ) Notice: Subject to any disclaimer, the term of this patent is extended or adjusted under 35 U.S.C. 154(b) by 1239 days.

(21) Appl. No.: 11/818,876

(22) Filed: Jun. 15, 2007

(65) Prior Publication Data

US 2008/0310754 A1    Dec. 18, 2008

(51) Int. Cl.
G06K 9/32    (2006.01)
G06K 9/36    (2006.01)
G06K 7/015    (2006.01)

(52) U.S. Cl. .................... 382/294; 382/287; 250/557
(58) Field of Classification Search .................. None
See application file for complete search history.

(56) References Cited

U.S. PATENT DOCUMENTS

| | | | | |
|---|---|---|---|---|
| 4,584,478 A * | 4/1986 | Genna et al. | ............. | 250/363.04 |
| 5,973,788 A * | 10/1999 | Pettersen et al. | ............. | 356/614 |
| 6,166,811 A | 12/2000 | Long et al. | | |
| 7,224,772 B2 | 5/2007 | Jacobs et al. | | |
| 2003/0043964 A1 | 3/2003 | Sorenson | | |
| 2005/0151963 A1 | 7/2005 | Pulla et al. | | |
| 2006/0125921 A1* | 6/2006 | Foote | ............................. | 348/159 |
| 2008/0075227 A1* | 3/2008 | Christoph et al. | ............. | 378/23 |

FOREIGN PATENT DOCUMENTS

| | | |
|---|---|---|
| WO | WO 00/37928 | 6/2000 |
| WO | WO 02/18958 | 3/2002 |
| WO | WO 2005/119174 | 12/2005 |

OTHER PUBLICATIONS

International Search Report and Written Opinion of the International Searching Authority, European Patent Office, Sep. 10, 2008, Int. Application No. PCT/US2008/067023, (17 pgs).
Reich et al., 3-D Shape Measurement of Complex Objects by Combining Photogrammetry and Fringe Projection, Optical Engineering, Jan. 2000, vol. 39—No. 1, Society of Photo-Optical Instrumentation Engineers (8 pgs).
U.S. Appl. No. 11/352,118, Gary Georgeson.
U.S. Appl. No. 11/739,835, Morteza Safai.

(Continued)

*Primary Examiner* — Randolph I Chu
(74) *Attorney, Agent, or Firm* — Toler Law Group (57) ABSTRACT

Exemplary systems and methods are provided for imaging a unit under test. Orientation of an imaging system is determined with a machine vision system, a unit under test is scanned with the imaging system, and the scanned image is processed into a substantially distortion-free image. The scanned image may be processed into a substantially distortion-free image by mapping a scanned image to coordinates determined by the machine vision system. By combining the position and orientation information collected at the time each image pixel is collected, the image can be assembled without distortion by mapping a detector signal to the appropriate image coordinate. Alternately, the scanned image may be processed into a substantially distortion-free image by mapping a scanned image to a predetermined matrix grid of coordinates, identifying distortion in the scanned image, and correcting identified distortion in the scanned image.

30 Claims, 6 Drawing Sheets

OTHER PUBLICATIONS

U.S. Appl. No. 11/744,115, Morteza Safia.
U.S. Appl. No. 11/550,292, Talion Edwards.
Shedlock, Daniel et al, "Optimization of a RSD X-Ray Backscatter System for Detecting Defects in the Space Shuttle External Tank Thermal Foam Insulation," Proceedings of the SPIE (International Society for Optical Engineering), Sep. 2005, pp. 205-216, vol. 5923, University of Florida, Gainesville, FL.

* cited by examiner

SYSTEM AND METHOD FOR ASSEMBLING SUBSTANTIALLY DISTORTION-FREE IMAGES

BACKGROUND

Imaging and scanning systems can be used in a variety of manufacturing and engineering uses, such as reverse engineering. For example, in reverse engineering a unit under test (UUT), such as a system or structure like a vehicle (such as an aircraft, a land vehicle, or a maritime vessel) or a building or a complex system (like a power generation facility) can be imaged. These images can be processed to provide two-dimensional drawings or three-dimensional models that can replace and/or supplement drawings or models that may not exist, or may not be accessible, or that may no longer be accurate due to modifications to the UUT.

Some imaging systems, such as x-ray backscatter systems, can reduce time and labor involved in reverse engineering by enabling imaging of "hidden" components or systems or structural details. Existing x-ray backscatter images are constructed one pixel at a time by mapping a detector signal to a grid matrix of rows and columns corresponding to measured angle of a collimator and distance along a travel path. When a UUT presents a flat surface, the x-ray backscatter system remains a constant distance away from the UUT with a constant orientation between the UUT and the direction of travel.

When a UUT presents curved sidewalls and/or complex curvature skins, such as those in an aircraft or other vehicle, existing x-ray backscatter systems may not always be able to be operated such that the x-ray backscatter system remains a constant distance away from the UUT with a constant orientation between the UUT and the direction of travel. Distortion of the x-ray image can result from moving the x-ray backscatter system either closer to or farther away from the UUT or from changing angular orientation between the x-ray backscatter system and the UUT. Any distortion that may be in the x-ray images may be carried forward into a three-dimensional model reconstructed from x-ray images taken from multiple perspectives.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In exemplary embodiments, systems and methods are provided for imaging a unit under test. Orientation of an imaging system is determined with a machine vision system, and a unit under test is scanned with the imaging system. The scanned image is processed into a substantially distortion-free image.

According to an aspect, the scanned image may be processed into a substantially distortion-free image by mapping a scanned image to coordinates determined by the machine vision system. By combining the position and orientation information collected at the time each image pixel is collected, the image can be assembled without distortion by mapping a detector signal to the appropriate image coordinate.

According to another aspect, the scanned image may be processed into a substantially distortion-free image by mapping a scanned image to a predetermined matrix grid of coordinates, identifying distortion in the scanned image, and correcting identified distortion in the scanned image.

In other exemplary embodiments, systems and methods are provided for reverse engineering a unit under test. A unit under test is prepared for imaging. Orientation of an imaging system is determined with a machine vision system, and the unit under test is scanned with the imaging system. Scanned images are processed into substantially distortion-free images. A data set is created from the substantially distortion-free images. Surfaces and structures are generated from the data set, and the surfaces and structures are integrated into a pre-existing design of the unit under test.

According to an aspect, the imaging system can include an x-ray backscatter system. In such a case, the x-ray backscatter system can include a rotating collimator, and machine vision image sensors may be mounted on the rotating collimator. Further, the machine vision system can be a photogrammetry system or a videogrammetry system.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Given by way of overview, exemplary systems and methods are provided for imaging a unit under test. Orientation of an imaging system is determined with a machine vision system, and a unit under test is scanned with the imaging system. The scanned image is processed into a substantially distortion-free image. For example, the scanned image may be processed into a substantially distortion-free image by mapping a scanned image to coordinates determined by the machine vision system. By combining the position and orientation information collected at the time each image pixel is collected, the image can be assembled without distortion by mapping a detector signal to the appropriate image coordinate. Alternately, the scanned image may be processed into a substantially distortion-free image by mapping a scanned image to a predetermined matrix grid of coordinates, identifying distortion in the scanned image, and correcting identified distortion in the scanned image. In other exemplary embodiments, systems and methods are provided for reverse engineering a unit under test. Details of exemplary embodiments will be set forth below.

Figure 1:
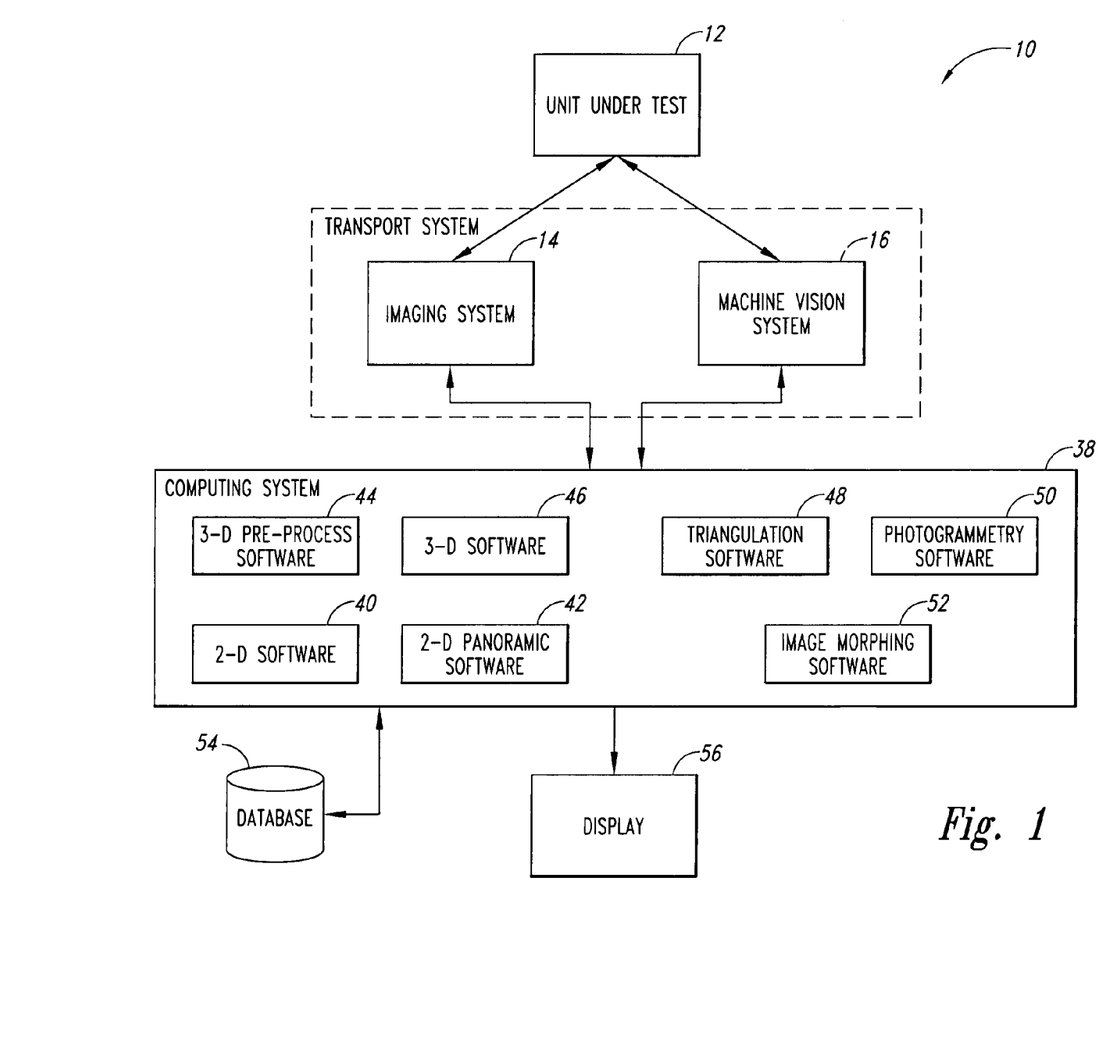
FIG. 1 is a block diagram of an exemplary system according to an embodiment.

Referring now to FIG. 1, an exemplary system 10 can image a unit under test (UUT) 12 and can produce an image without distortion or can correct any distortion that may be present in scanned images. To that end, the system 10 may be used for determining the physical dimensions and configuration of structure and/or systems of the UUT 12, such as by using non-line of sight reverse engineering to analyze hidden objects of the structure and/or systems of the UUT 12. However, the system 10 can be used for any image-based non-destructive evaluation methods that entail tiling of images. The UUT 12 can include any of a variety of objects that include structures and/or systems with hidden objects, such as without limitation power plants. processing plants, refineries and transportation systems, including, but not limited to, aircraft, helicopters, land vehicles, automobiles, trains, ships, submarines, or the like.

Moreover, because any distortion in the scanned images is corrected (as discussed further below), x-ray backscatter imaging can be performed to reverse engineer the UUT 12—even when the UUT 12 includes curved sidewalls and complex curvature skins, such as in the non-limiting examples listed above. Such correction of distortion thereby enables construction of substantially distortion-free images and models of structures and/or systems with hidden objects in UUTs 12 that include curved sidewalls and complex curvature skins.

As such, the system 10 is well suited for imaging an aircraft that is scheduled to undergo modification. In such a case, the aircraft can be scanned and data can be collected by the system 10. After the aircraft has been scanned, the aircraft returned to service while the collected data is processed as desired for modifications to be performed in the scheduled availability.

To that end, an imaging system 14 captures two-dimensional, two-dimensional panoramic, and three-dimensional geometric information of the hidden objects of the structure and/or systems of the UUT 12. The imaging system 14 suitably may be an x-ray backscatter system that utilizes x-ray backscattering technology to inspect structure and/or systems of the UUT 12. In such an exemplary embodiment, the x-ray backscatter unit electronically generates x-rays to examine the UUT 12 (and its components, including any hidden objects) by capturing data from x-ray photons that are scattered from the objects and/or systems undergoing inspection and produces characteristic shadow-like images similar to medical x-rays. However, the imaging system 14 is not limited to an x-ray backscatter system. The imaging system 14 can be any raster-based (that is, pixel-by-pixel), line-by-line imaging system, such as terahertz beam imaging, microwave imaging, infrared imaging, amplitude modulation radio frequency imaging, and the like.

The x-ray backscatter unit scans the interior of the UUT 12. Scanning can be done from either the inside or the outside of the UUT 12 with a modified x-ray backscatter instrument that "sees" the hidden objects behind the walls of the UUT 12. The x-ray backscatter instrument may be modified so that the instrument can move within the structure and/or system of the UUT 12, for example by installing tracks in the structure and/or system of the UUT 12. Furthermore, the instrument may be modified so it can take multiple imaging to capture two-dimensional, two-dimensional panoramic, and/or three-dimensional models and have more than one position to be able to maneuver around objects in the UUT 12. It will be appreciated that the x-ray energies can be lower if the scanning is from the inside, because the transmitted beam does not have to penetrate the skin. Fiducials of known dimensions and/or depth may be placed in the region of the x-ray shot in order to supplement accurate dimensional and depth information. Existing structure and/or system definition information may be used as parameters for reconstructing the collected data into two-dimensional, two-dimensional panoramic, and/or three-dimensional data sets.

In an embodiment, the x-ray backscatter unit can be utilized by laying a track down on the inside of the UUT 12 and putting the system on the track so that an x-ray source puts out x-rays from the inside the UUT 12. Some of the x-rays will scatter back, and detectors will detect the scattered x-rays and produce an image of the interior of the UUT. In the case when the UUT 12 is an aircraft, an image of the interior of the aircraft can thus be produced without having to remove the aircraft's panels. If the UUT 12 is large enough, the x-ray backscatter inspection system can be placed in a vehicle, such as a van or the like, and the vehicle can be driven directly into the UUT 12.

A machine vision system 16 collects information that is used to determine orientation of the imaging system, which in turn is used in assembling a substantially distortion-free image or correcting any distortion that may be present in scanned images from the imaging system 14. The machine vision system 16 may be any suitable machine vision system as desired for a particular application. For example, the machine vision system 16 suitably may be a videogrammetry system or a photogrammetry system, such as that employed on a white light scanning system like the Atos™-series of white light triangulation digitizers available from GOM gmbH, Braunschweig, Germany. As another example, the machine vision system suitably may be similar to that employed on a laser scanner, such as the HandyScan 3D™ scanner available from Creaform Inc., Levis, Quebec, Canada.

As will be discussed further below, to determine orientation of the imaging system, the unit under test 12 and several fiducials (not shown in FIG. 1) are imaged with at least two spaced-apart machine vision image sensors (not shown in FIG. 1) mounted on a portion of the imaging system 14. Distance between the unit under test 12 and the machine vision image sensors may be triangulated. Also, angular orientation between the unit under test 12 and the machine vision image sensors may be calculated.

Figure 2:
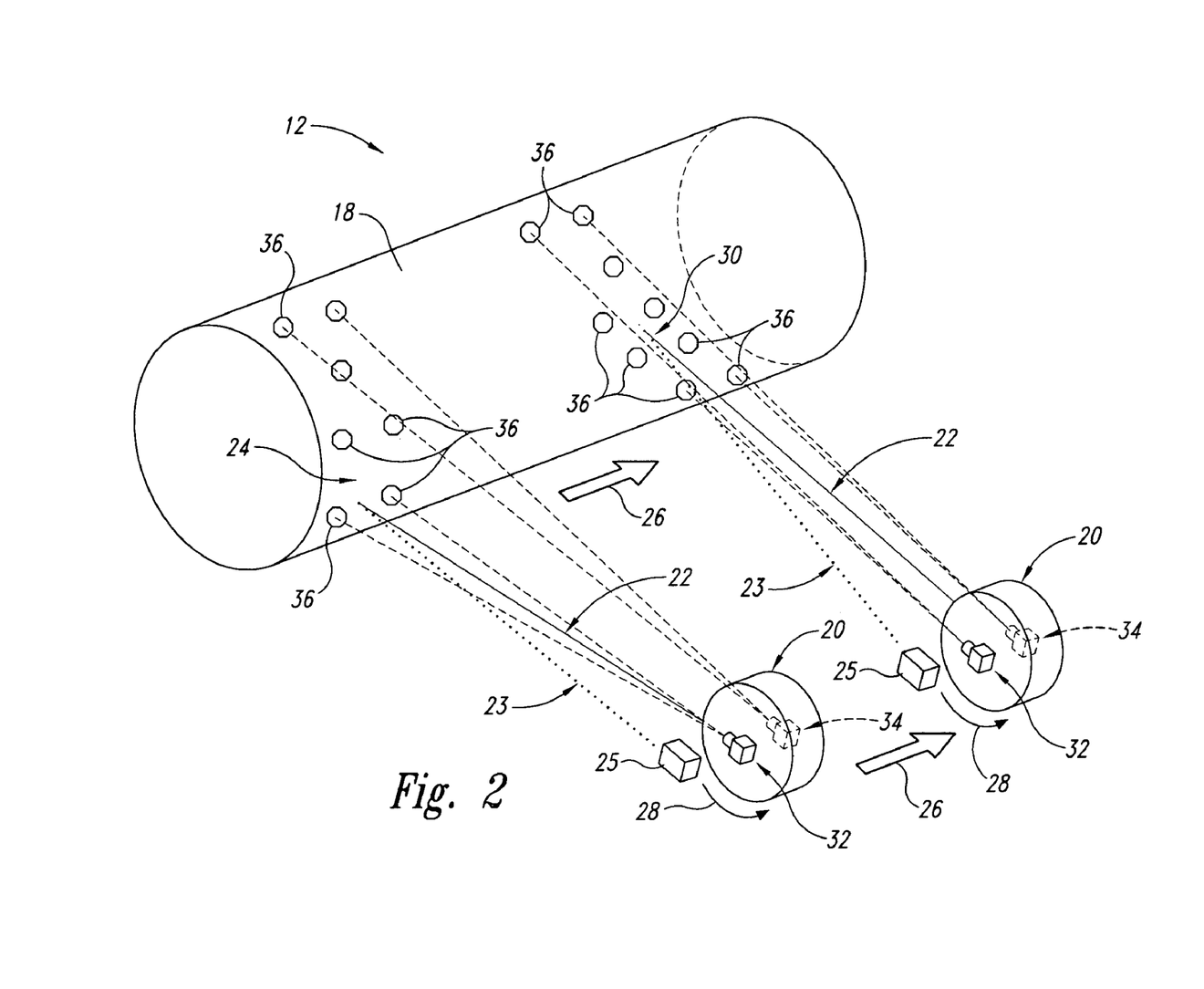
FIG. 2 is a perspective illustration in schematic form of an exemplary unit under test being imaged by components of an exemplary imaging system.

Referring additionally to FIG. 2, the UUT 12 includes a curved sidewall 18. Given by way of non-limiting example, the UUT 12 may be an aircraft (a portion of a fuselage of the aircraft being shown) and the curved sidewall 18 is a fuselage skin. Fiducials 36, such as active infra-red emitters or photoreflective decals or the like, are mounted on the exterior of the curved sidewall 18.

An aperture in the rotating collimator 20 of the imaging system 14 emits x-rays 22 that strike a portion 24 of the UUT 12 being imaged. In this instance, the portion 24 is shown at a location relatively low on the curved sidewall 18. The x-rays 22 are scattered off the UUT 12. Scattered x-rays 23 are detected by detector(s) 25. During data collection, the rotating collimator can be moved laterally (as shown by an arrow 26) and rotationally (as shown by an arrow 28) to emit the x-ray emissions 22 onto another portion 30 of the UUT being imaged. In this instance, the portion 30 is shown closer to a mid-point on the curved sidewall 18. Thus, the portion 30 (and any hidden objects behind the curved sidewall at the portion 30) is closer to the detector 25 than is the portion 24 (and any hidden objects behind the curved sidewall at the portion 24). While such a difference in distances between (i) the portion 24 and the collimator 20 and (ii) the portion 30 and the collimator 20 may have produced distortion in conventional images of structure and/or systems with hidden objects, according to exemplary embodiments any such distortion that may have resulted thereby is either prevented from arising in an assembled image or is corrected in an assembled image, as will be discussed further below.

Image sensors 32 and 34 of the machine vision system 16 are mounted on the rotating collimator 20. The image sensors 32 and 34 are laterally spaced-apart from each other on the collimator 20 by a distance as desired for a particular application. Mounting the image sensors 32 and 34 on the collimator 20 a known distance apart from each other enables the machine vision system 16 to determine orientation of the imaging system 14 relative to the unit under test 12. Furthermore, the orientation between the collimator 20 and the detector 25 which is rigidly mounted on the imaging system 14 is recorded by an encoder on the rotating axis of the collimator 20. To that end, the three-dimensional relationship between the imaging system 14 (at the detector 25) and the UUT 12 being scanned can be determined using principles of triangulation and photogrammetry or videogrammetry.

The image sensors 32 and 34 are any suitable camera for use with the type of machine vision technology utilized by the machine vision system 16, such as for example a machine vision system used by white light scanners or laser scanners or the like. Regardless of technology employed by the image sensors 32 and 34, the image sensors 32 and 34 each has a large field of view. For example, the field of view of the image sensors 32 and 34 suitably is large enough to image at least three fiducials 36, at least one of the fiducials 36 being mounted toward the top of the curved sidewall 18 and at least one of the fiducials 36 being mounted toward the bottom of the curved sidewall 18.

Because the image sensors 32 and 34 are laterally spaced-apart a known distance on the rotating collimator 20, the distance to the fiducials 36 (regardless of whether the fiducials 36 are active infra-red emitters or photo-reflective decals) on the UUT 12 can be automatically detected. Also, because that the image sensors 32 and 34 have a large field of view and can sense several of the fiducials 36, the distance to several of the fiducials 36 can be used to calculate the orientation of the collimator 20 (of the imaging system 14) relative to the UUT 12 being scanned. Because the detector 25 is rigidly attached to the imaging system 14, if (i) the direction that the collimator 20 (and therefore the image sensors 32 and 34) is pointed relative to the portion of the UUT being scanned is known and (ii) the distance of the collimator 20 (and therefore the image sensors 32 and 34) to the portion of the UUT being scanned is known, then distortion can be prevented from arising or, alternately, any distortion that may exist in the resulting x-ray backscatter image can be corrected. As will be explained further below, distortion can be prevented from arising during the image assembly, or correction of distortion can be done by superimposing images from the image sensors 32 and 34 on a two-dimensional image (such as a two-dimensional x-ray backscatter image) from the imaging system 14, and making geometrical correction to the image from the imaging system 14 using the detectable fiducials 36.

The UUT 12 is scanned by the imaging system 14 and images of the UUT 12 and the fiducials 36 are taken at as many locations and orientations along the curved sidewall 18, such as without limitation the portions 24 and 30, as desired for a particular purpose. To that end, the rotating collimator 20, the x-ray detector 25, and the image sensors 32 and 34 are operatively coupled in data communication with a computing system 38.

Referring back to FIG. 1, the computing system 38 includes conventional two-dimensional software 40 that utilizes a superimposing algorithm to generate projected two-dimensional images of the surfaces of the objects of the UUT 12. In one embodiment, two-dimensional images from the conventional two-dimensional software 40 can be stitched together using conventional two-dimensional panoramic image creation software 42 to create a spherical immersive image. In another embodiment, three-dimensional pre-process software 44 constructs a three-dimensional data point set of the structure and/or system from the collected data and conventional three-dimensional software 46 digitally reconstructs the three-dimensional point data into three-dimensional surfaces that define the hidden objects.

The computing system 38 also includes software for determining orientation of the imaging system 14. For example, triangulation software 48 utilizes triangulation principles to determine the three-dimensional relationship between the imaging system 14 at the x-ray detector 25 (FIG. 2) and the UUT 12 being scanned. In some embodiments, photogrammetry software 50 evaluates the location of the fiducials 36 (FIG. 2) sensed by the image sensors 32 and 34 (FIG. 2). Also, image morphing software 52 morphs the image scanned by the imaging system 14 to make geometrical corrections to the scanned image, thereby correcting any distortion in the scanned image.

Finally, generated data are stored in a database 54 and displayed on a display device 56, such as a monitor or liquid crystal display, for data collectors to view. Given by way of non-limiting example, cabling, wiring, tubing, and structure of the UUT 12, such as without limitation an aircraft, along with the relative location of all objects and/or systems are displayed. Energy information from the scattered x-rays can also be used to distinguish between material types (for example, aluminum versus plastic pipe) and possibly even system contents (for example, water line versus air).

Figure 3:
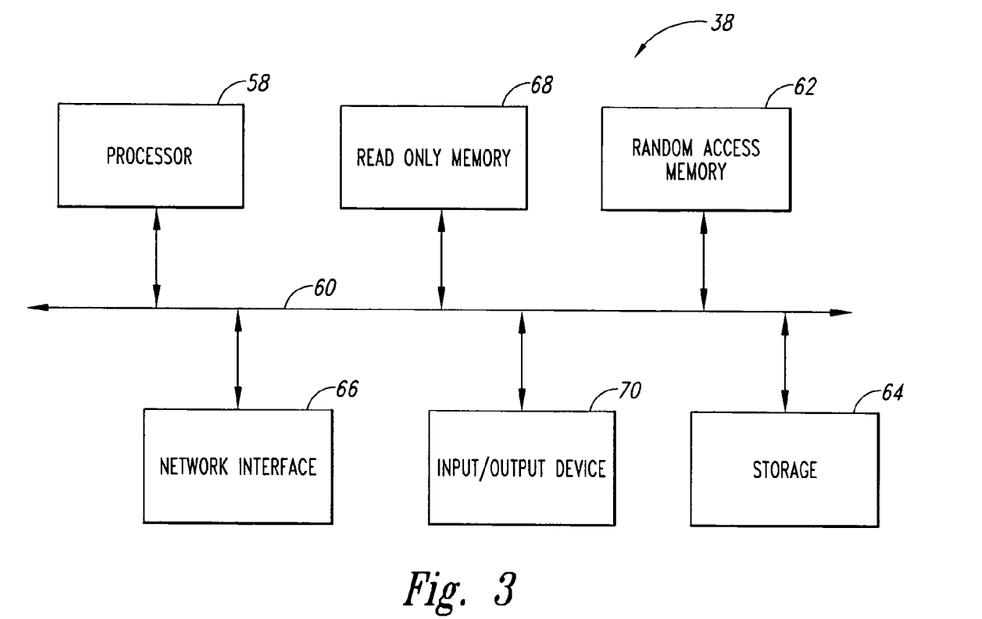
FIG. 3 is a block diagram of an exemplary computing system component of the system of FIG. 1.

Referring now to FIG. 3, a typical computing system 38 (that also may be referred to as a host computer or system) utilized in an embodiment includes a central processing unit ("CPU") (or microprocessor) 58 connected to a system bus 60. Random access main memory ("RAM") 62 is coupled to the system bus 60 and provides the CPU 58 with access to memory storage 64 for storing the generated image. When executing program instructions, the CPU 58 stores those process steps in the RAM 62 and executes the stored process steps out of the RAM 62.

The computing system 38 connects to a computer network (not shown) via a network interface 66 and through a network connection (not shown). One such network is the Internet that allows the computing system 38 to download applications, code, documents and other electronic information.

Read only memory ("ROM") 68 is provided to store invariant instruction sequences such as start-up instruction sequences or basic input/output operating system (BIOS) sequences.

An Input/Output ("I/O") device interface 70 allows the computing system 38 to connect to various input/output devices, for example, a keyboard, a pointing device ("mouse"), a monitor, printer, a modem, and the like. The I/O device interface 70 is shown as a single block for simplicity and may include several interfaces to interface with different types of I/O devices.

It will be appreciated that embodiments are not limited to the architecture of the computing system 38 shown in FIG. 2. Based on the type of applications/business environment, the computing system 38 may have more or fewer components. For example, the computing system 38 can be a set-top box, a lap-top computer, a notebook computer, a desktop system, or other types of systems.

Figure 4:
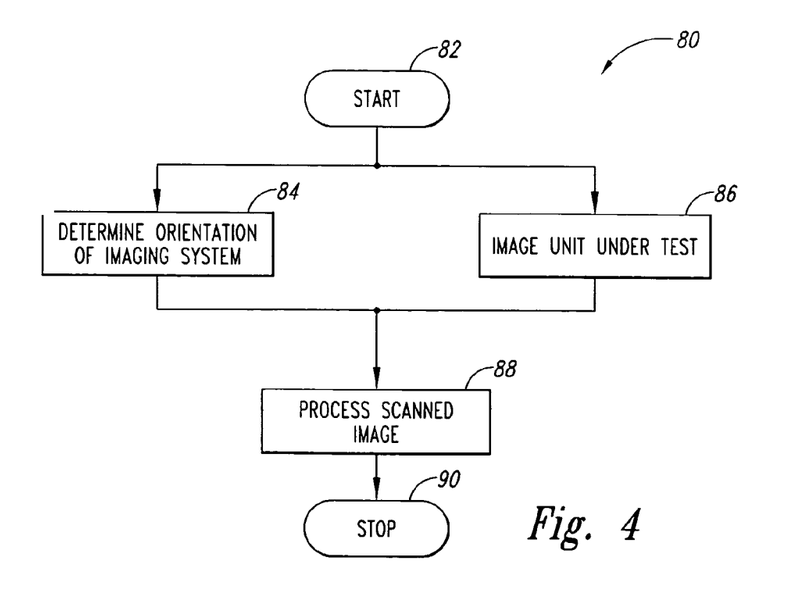
FIG. 4 is a flow chart of an exemplary method according to an embodiment.

Referring now to FIG. 4, a method 80 is provided for imaging a unit under test and creating an image that is substantially distortion-free. The method 80 starts at a block 82. In general, at a block 84 orientation of an imaging system is determined, and at a block 86 a unit under test is imaged by the imaging system. The blocks 84 and 86 may occur in any order relative to each other. Moreover, the blocks 84 and 86 may occur simultaneously. No limitation regarding temporal ordering is intended by illustration in FIG. 4. At a block 88, the scanned image is processed into a substantially distortion free image. For example, the scanned image may be processed into a substantially distortion-free image by mapping a scanned image to coordinates determined by the machine vision system. By combining the position and orientation information collected at the time each image pixel is collected, the image can be assembled without distortion by mapping a detector signal to the appropriate image coordinate. Alternately, the scanned image may be processed into a substantially distortion-free image by mapping a scanned image to a predetermined matrix grid of coordinates, identifying distortion in the scanned image, and correcting identified distortion in the scanned image. The method 80 stops at a block 90. Exemplary details will be set forth below.

Figure 5:
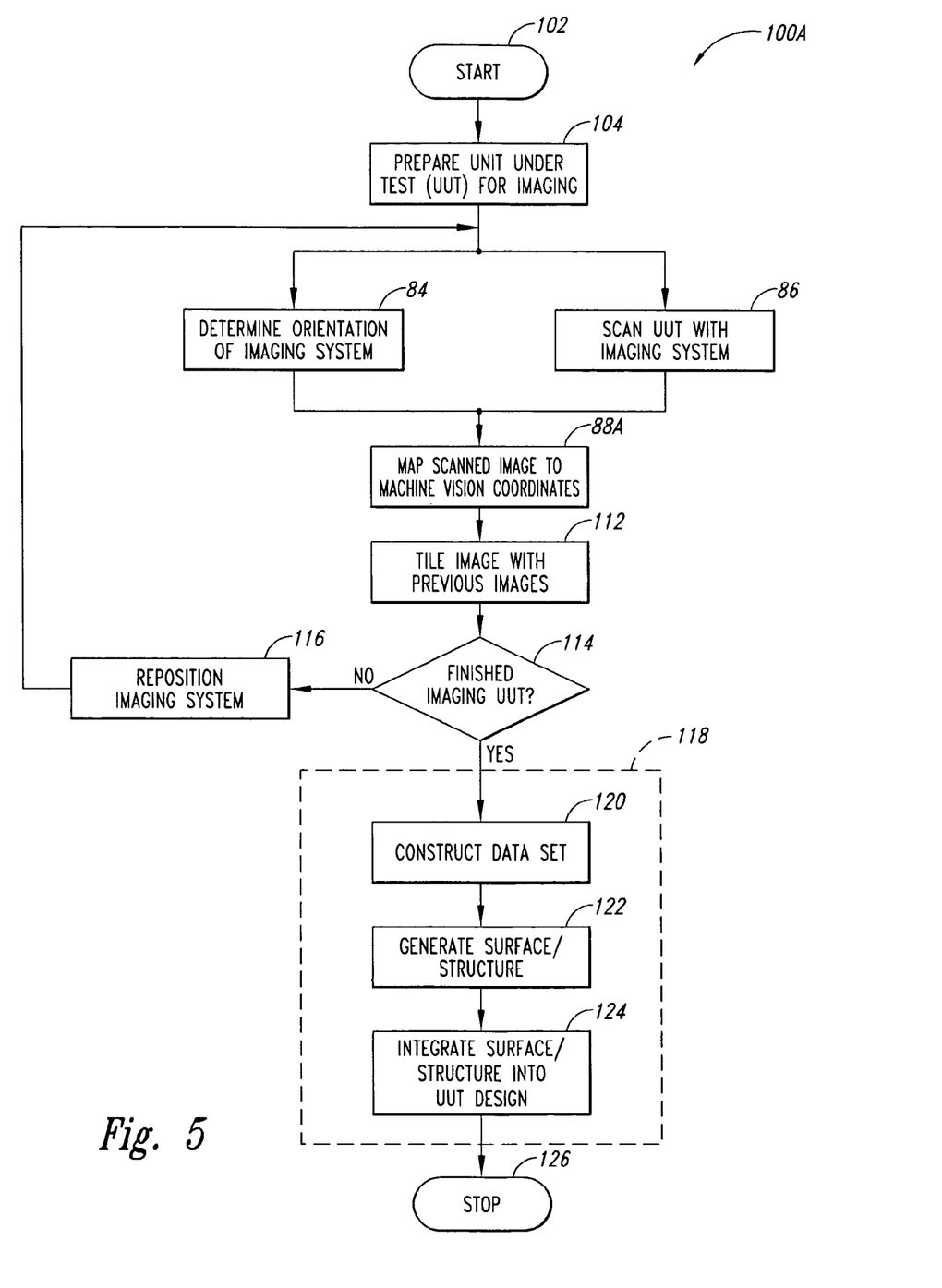
FIG. 5 is a flow chart showing details of aspects of the method of FIG. 4.

Referring now to FIG. 5, details of a first example, in which the scanned image may be processed into a substantially distortion-free image by mapping a scanned image to coordinates determined by the machine vision system, will now be explained in the context of a method 100A for reverse engineering a unit under test. The method 100A starts at a block 102. At a block 104 a unit under test (UUT) is prepared for imaging. In one non-limiting embodiment, the UUT is an aircraft. In such an exemplary case, at the block 104 access is provided to an aircraft that is to undergo imaging, such as without limitation x-ray backscatter imaging.

Figure 6:
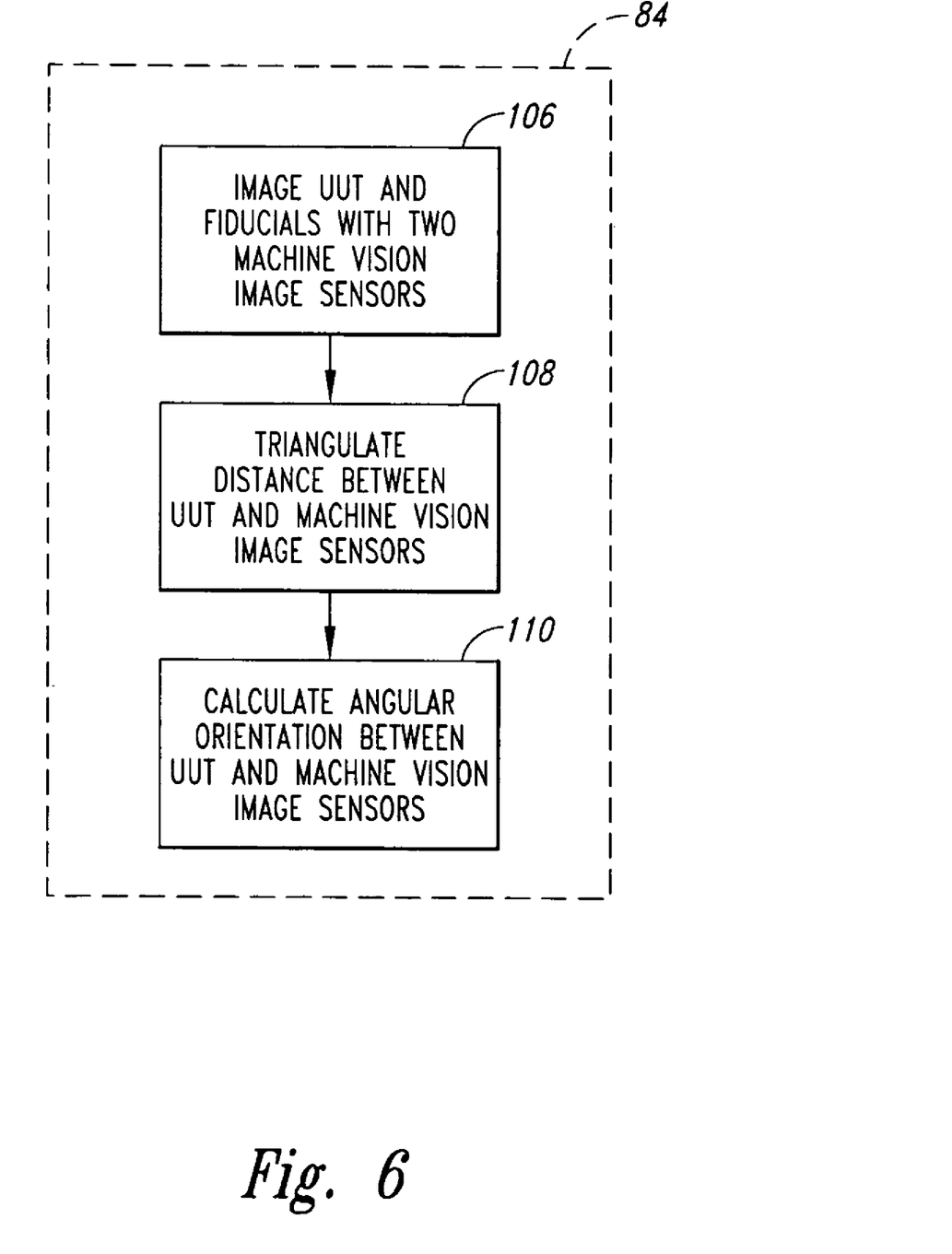
FIG. 6 is a flow chart showing details of portions of the method of FIG. 5.

At the block 84, orientation of the imaging system 14 (FIG. 1) is determined. Referring additionally to FIG. 6, at the block 84 the machine vision system 16 (FIG. 1), including the sensors 32 and 34 (FIG. 2), cooperate with the computing system 38 and its triangulation software 48 and/or photogrammetry software 50 (both FIG. 1), as applicable. Within processing of the block 84, at a block 106 the UUT and the fiducials 36 within the field of view of the image sensors 32 and 34 are imaged with the image sensors 32 and 34. If applicable, at the block 108 the photogrammetry software 50 (FIG. 1) evaluates the location of fiducials 36 on the curved sidewall 18 (FIG. 2) that are sensed by the image sensors 32 and 34.

At a block 108, the triangulation software 48 utilizes triangulation techniques to determine distance between the portion of the UUT being scanned and the image sensors 32 and 34. Because the image sensors 32 and 34 are mounted on the collimator 20, the distance between the portion of the UUT being scanned and the image sensors 32 and 34 is also the distance between the portion of the UUT being scanned and the imaging system 14. In addition, at a block 110 angular orientation between the UUT and the image sensors 32 and 34 (and, therefore, the imaging system 14) is also determined.

Referring back to FIG. 5, concurrently with determination of orientation of the imaging system at the block 84, at the block 86 the UUT is imaged. Processing at the block 86 includes scanning the UUT with the imaging system 14 (FIG. 1), as described above.

Once the orientation of the imaging system 16 is determined at the block 84 and the UUT is scanned with the imaging system 14 at the block 86 concurrently therewith, at a block 88A the scanned image is assembled substantially without any distortion. At the block 88A, a scanned image is mapped to coordinates determined by the machine vision system 16. By combining the position and orientation information collected by the machine vision system 16 at the block 84 at the time each image pixel is collected by the imaging system 14 at the block 86, the image can be assembled without distortion by mapping a signal from the detector 25 (FIG. 2) to the appropriate image coordinate determined at the block 84.

At a block 112, the substantially distortion-free image assembled at the block 88A can be tiled with previously-assembled images. Because the fiducials 36 (FIG. 2) remain in a constant reference to the UUT, the scanned images from different locations and orientations can be stitched together by registering the fiducials 36 to each other.

At a decision block 114 a determination is made at whether imaging the UUT is finished. If not, then at a block 116 the imaging system 14 (FIG. 1) is repositioned. For example, as described above an x-ray backscatter unit can be re-positioned (either inside or outside the UUT) and the collimator 20 (with the image sensors 32 and 34 mounted thereon) can be re-positioned accordingly to emit x-ray emissions. Processing of the blocks 84, 86, 88A, and 112 are repeated as described above.

When imaging of the UUT is finished and all desired data is collected, the UUT (such as an aircraft) can be returned to service. At a block 118, the substantially distortion-free images can be post-processed as desired. For example, at a block 120 a data set can be constructed. In one non-limiting embodiment, a three-dimensional data point set of the structure and/or systems of the UUT can be constructed from the collected data, such as by using the three-dimensional pre-process software 44 (FIG. 1) in the computing system 38.

At a block 122, surface and/or structure can be generated. For example, the conventional three-dimensional software 46, such as without limitation Innovmetric Polyworks or Raindrop Geomagic, digitally reconstructs the three-dimensional point data into three-dimensional surfaces that define the hidden objects.

At a block 124 the generated surfaces and structures can be integrated into design of the UUT. For example, the three-dimensional surfaces are translated into a structure and/or system reference coordinate system. The generated three-dimensional surfaces can then be used like traditional engineering data, by combining them with other models to form a three-dimensional CAD model of the complex structure and/or system. The three-dimensional model of the hidden structures can be used by designers to plan the routing and installation of hardware and systems. Once the UUT, such as an aircraft, is available for modification, the walls and insulation are removed from the aircraft and the hardware is installed as designed the first time without the need for costly re-design. The model is saved in the database 54 (FIG. 1) for any future modifications.

It will be appreciated that the three-dimensional images produced by reconstruction backscatter x-rays can be produced in a variety of ways including, but not limited to: (1) orienting collimators to collect scattered x-rays coming from several known orientations; (2) using multiple detectors that are collimated to only register x-rays coming from specific directions; (3) a flying spot detector; (4) upgrading a two-dimensional scan system (such as the AS&E z-backscatter system) to scan along the length of the aircraft with the sources and fanned collimators oriented in different directions; and (5) making multiple passes of the aircraft while changing the orientation of the source and fanned collimator.

When the images have been post-processed as desired at the block 118, the method 100A stops at a block 126.

Figure 7:
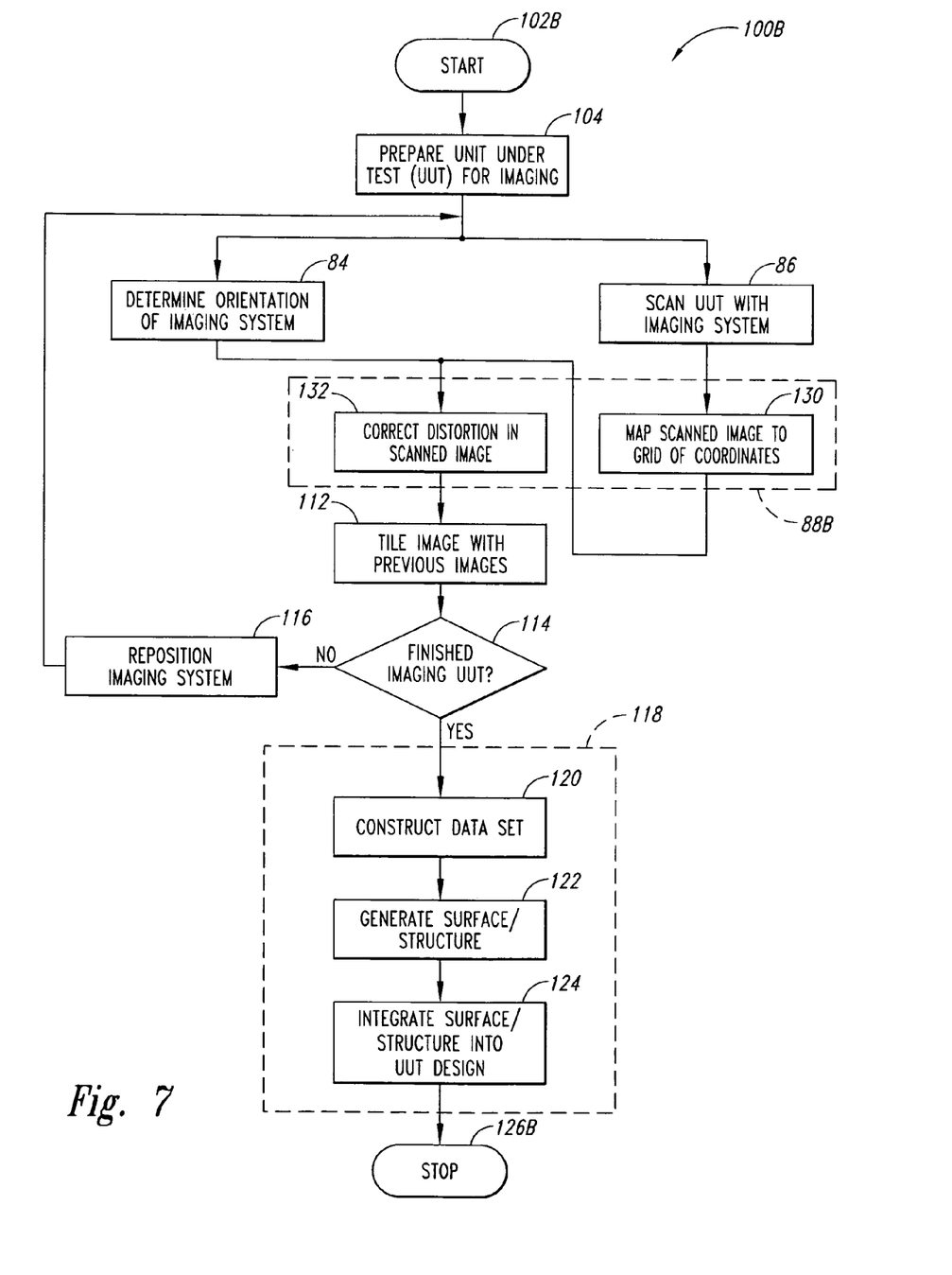
FIG. 7 is a flow chart showing details of alternate aspects of the method of FIG. 4.

Referring now to FIG. 7, details of a second example, in which any distortion in the scanned image may be identified and corrected, thereby creating a substantially distortion-free image, will now be explained in the context of a method 100B for reverse engineering a unit under test. Processing blocks in common with the method 100A (FIG. 5) are assigned the same reference numbers, and their details need not be repeated.

The method 100B starts at a block 102B. At the block 104 the unit under test (UUT) is prepared for imaging. At the block 84 the orientation of the imaging system is determined and, concurrently therewith, at the block 86 the UUT is scanned with the imaging system.

Unlike the block 88A (FIG. 5) (in which in which the scanned image may be processed into a substantially distortion-free image by mapping a scanned image to coordinates determined by the machine vision system, at a block 88B the scanned image may be processed into a substantially distortion-free image by mapping a scanned image to a predetermined matrix grid of coordinates, identifying distortion in the scanned image, and correcting identified distortion in the scanned image.

Processing of the block 88B includes mapping the scanned image to a grid matrix of coordinates at a block 130. For example, a signal from the detector 25 (FIG. 2) may be mapped to a grid matrix of rows and columns corresponding to measured angle of the collimator 20 and distance along a travel path in a known manner.

However, processing of the block also includes correcting distortion in the scanned image at a block 132. For example, any distortion in the scanned image may be identified using the imaged fiducials to register, that is align, the image from the image sensors 32 and 34 with the scanned image from the imaging system 14. For example, necking, or reduction in the total image height, occurs when the object is farther away from the detector. This reduction occurs because the object appears smaller as it gets farther away. In addition, distortion can be seen by an operator manually comparing the images registered by the machine vision system to the scanned images.

At the block 132, after any distortion is identified, geometrical corrections are made to the scanned image, thereby correcting the identified distortion. Given by way of non-limiting example, the image morphing software 52 (FIG. 1) can morph the scanned image from the imaging system 14. In such a case, the image morphing software 52 morphs identified distorted portions of the scanned image toward corresponding portions of a non-distorted visual image. Because the photogrammetry software 50 (FIG. 1) is capable of producing a point set representing the location of the fiducials 36 (FIG. 2), it is also possible to automatically match the location of the fiducials 36 in the scanned images to the corresponding point location from the photogrammetry data.

Processing of the method 100B continues as described above with the block 112, the decision block 114, and the blocks 116, 118, 120, 122, and 124. The method 100B stops at a block 126B.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for imaging a unit under test, the method comprising:
    capturing an image pixel of a scanned image of a unit under test from a detector signal using one or more detectors of an imaging system;
    concurrently with capturing the image pixel, collecting data used to determine orientation and position of the imaging system relative to the unit under test using a machine vision system, wherein a plurality of sensors of the machine vision system are mounted on the imaging system; and
    mapping the image pixel to coordinates determined by the machine vision system based on the data collected to determine the orientation and the position of the imaging system relative to the unit under test to generate a substantially distortion-free image of the unit under test.

2. The method of claim 1, wherein generating the substantially distortion-free image of the unit under test includes:
    identifying distortion in the scanned image; and
    correcting the identified distortion in the scanned image.

3. The method of claim 1, wherein the plurality of sensors of the machine vision system includes at least two spaced-apart machine vision sensors mounted on the imaging system, and wherein collecting the data used to determine the orientation and the position of the imaging system relative to the unit under test includes sensing one or more fiducials positioned on the unit under test using the at least two spaced-apart machine vision sensors mounted on the imaging system.

4. The method of claim 3, wherein determining the orientation and the position of the imaging system relative to the unit under test includes triangulating distance between the unit under test and the at least two spaced-apart machine vision image sensors.

5. The method of claim 1, wherein determining the orientation and the position of the imaging system relative to the unit under test includes calculating angular orientation between the unit under test and the machine vision system.

6. The method of claim 1, further comprising tiling a plurality of substantially distortion-free images.

7. A method of imaging a unit under test, the method comprising:
    collecting data used to determine orientation and position of an imaging system relative to a unit under test, as the imaging system is moved relative to the unit under test, using a machine vision system mounted on the imaging system, wherein the machine vision system is configured to determine an orientation and position of the machine vision system relative to the unit under test, and wherein the orientation and position of the machine vision system corresponds to the orientation and position of the imaging system;
    scanning the unit under test with the imaging system to capture a scanned image of the unit under test concurrently with the machine vision system collecting the data used to determine the orientation and position of the imaging system relative to the unit under test; and
    mapping the scanned image to coordinates determined by the machine vision system, wherein the coordinates represent the orientation and the position of the imaging system relative to the unit under test determined by the machine vision system when the scanned image was captured.

8. A method of imaging a unit under test, the method comprising:
collecting data used to determine orientation and position of a movable imaging system using a machine vision system, wherein the orientation and the position are determined by one or more sensors of the machine vision system mounted on a collimator of the movable imaging system such that the one or more sensors move with the movable imaging system as the movable imaging system is used to capture one or more scanned images of a unit under test;
mapping the one or more scanned images to a grid matrix of rows and columns corresponding to a measured angle of the collimator of the movable imaging system and a distance along a travel path of the movable imaging system;
identifying distortion in at least one scanned image of the one or more scanned images; and
correcting the identified distortion in the at least one scanned image.

9. The method of claim 8, wherein correcting the identified distortion further includes making geometrical corrections to the at least one scanned image.

10. The method of claim 9, wherein making the geometrical corrections to the at least one scanned image includes morphing the at least one scanned image.

11. A method of reverse engineering a unit under test, the method comprising:
collecting data used to determine position and orientation of an imaging system relative to a unit under test using a machine vision system that includes one or more sensors mounted on the imaging system;
capturing one or more scanned images of the unit under test using the imaging system concurrently with collecting the data used to determine the position and orientation of the imaging system relative to unit under test;
mapping the one or more scanned images to the position and orientation of the imaging system determined by the machine vision system;
processing the one or more scanned images into substantially distortion-free images;
creating a data set from the substantially distortion-free images;
generating surfaces and structures of the unit under test from the data set; and
integrating the surfaces and the structures into a pre-existing design of the unit under test.

12. The method of claim 11, wherein collecting the data used to determine the position and the orientation of the imaging system includes sensing a plurality of fiducials mounted on the unit under test with at least two spaced-apart sensors of the machine vision system mounted on the imaging system.

13. The method of claim 12, wherein determining the position and the orientation of the imaging system further includes triangulating distance between the unit under test and the at least two spaced-apart sensors of the machine vision system.

14. The method of claim 13, wherein determining the position and the orientation of the imaging system further includes calculating angular orientation between the unit under test and the at least two spaced-apart sensors of the machine vision system.

15. The method of claim 11, wherein processing the one or more scanned images into the substantially distortion-free images includes:
mapping at least one scanned image of the one or more scanned images to a predetermined matrix grid of coordinates;
identifying distortion in the at the least one scanned image; and
correcting the identified distortion in the at least one scanned image.

16. The method of claim 11, further comprising tiling a plurality of substantially distortion-free images.

17. A system for imaging a unit under test, the system comprising:
an imaging system configured to capture pixels of one or more scanned images of a unit under test;
a machine vision system configured to sense a plurality of fiducials positioned on the unit under test, the machine vision system including at least two spaced-apart sensors mounted on the imaging system, wherein the at least two spaced-apart sensors collect data used to determine an orientation and a position of the imaging system relative to the unit under test concurrently with the imaging system capturing each of the pixels of the one or more scanned images of the unit under test; and
a computing system operatively coupled to the imaging system and to the machine vision system, the computing system including:
a first computer processing component configured to determine the orientation and the position of the imaging system relative to the unit under test using the data collected by the machine vision system; and
a second computer processing component configured to map the pixels of the one or more scanned images into a substantially distortion-free image of the unit under test.

18. The system of claim 17, wherein the first computer processing component includes a third computer processing component configured to use triangulation to determine a distance between the unit under test and the at least two spaced-apart image sensors of the machine vision system.

19. The system of claim 18, wherein the first computer processing component includes a fourth computer processing component configured to calculate angular orientation between the unit under test and the at least two spaced-apart image sensors of the machine vision system.

20. The system of claim 17, wherein the second computer processing component includes:
a fifth computer processing component configured to map at least one scanned image of the one or more scanned images to a predetermined matrix grid of coordinates;
a sixth computer processing component configured to identify distortion in the at least one scanned image; and
a seventh computer processing component configured to correct identified distortion in the at least one scanned image.

21. The system of claim 17, further comprising an eighth computer processing component configured to tile a plurality of substantially distortion-free images.

22. A system for reverse engineering a unit under test, the system comprising:
an imaging system configured to capture pixels of one or more scanned images of a unit under test;
a machine vision system configured to sense a plurality of fiducials installed on the unit under test and to collect data used in determining an orientation and a position of the imaging system relative to the unit under test using at least two spaced-apart sensors mounted on the imaging system concurrently with the imaging system capturing the pixels of the one or more scanned images of the unit under test; and a computing system operatively coupled to the imaging system and to the machine vision system, the computing system including:

a first computer processing component configured to use the data collected by the machine vision system to determine the orientation and the position of the imaging system relative to the unit under test;

a second computer processing component configured to map the pixels of the one or more scanned images to the orientation and position of the imaging system determined for a time when the pixels of the one or more scanned images were captured to process the one or more scanned images into substantially distortion-free images;

a third computer processing component configured to create a data set from the substantially distortion-free images;

a fourth computer processing component configured to generate surfaces and structures from the data set; and a fifth computer processing component configured to integrate the surfaces and the structures into a pre-existing design of the unit under test.

23. The system of claim 22, wherein the imaging system includes an x-ray backscatter system.

24. The system of claim 23, wherein:

the x-ray backscatter system includes a rotating collimator; and the at least two spaced-apart image sensors are mounted on the rotating collimator.

25. The system of claim 22, wherein the machine vision system includes one of a photogrammetry system and a videogrammetry system.

26. The system of claim 22, wherein the first computer processing component includes a sixth computer processing component configured to triangulate distance between the unit under test and the at least two spaced-apart sensors.

27. The system of claim 26, wherein the first computer processing component includes a seventh computer processing component configured to calculate angular orientation between the unit under test and the at least two spaced-apart sensors.

28. The system of claim 22, wherein the second computer processing component includes an eighth computer processing component configured to map the one or more scanned images to coordinates determined by the machine vision system based on the orientation and position determined by the machine vision system.

29. The system of claim 22, wherein the second computer processing component includes:

a ninth computer processing component configured to map at least one scanned image of the one or more scanned images to a predetermined matrix grid of coordinates determined from the data collected to determine the orientation and position of the imaging system relative to the unit under test;

a tenth computer processing component configured to identify distortion in the at least one scanned image; and an eleventh computer processing component configured to correct identified distortion in the at least one scanned image.

30. The system of claim 22, further comprising a twelfth computer processing component configured to tile a plurality of substantially distortion-free image.

* * * * *